(12) United States Patent
Gabber et al.

(10) Patent No.: US 8,121,991 B1
(45) Date of Patent: *Feb. 21, 2012

(54) IDENTIFYING TRANSIENT PATHS WITHIN WEBSITES

(75) Inventors: Eran Gabber, Summit, NJ (US);
Michael Flaster, Tenafly, NY (US);
Ruoming Pang, Jersey City, NJ (US);
Shanmugavelayutham Muthukrishnan, New York, NY (US)

(73) Assignee: Google Inc., Mountain View, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 12/340,368

(22) Filed: Dec. 19, 2008

(51) Int. Cl.
*G06F 7/00* (2006.01)

(52) U.S. Cl. ........................................ 707/695; 707/722

(58) Field of Classification Search .................. 707/736, 707/741
See application file for complete search history.

(56) References Cited

U.S. PATENT DOCUMENTS

| | | | |
|---|---|---|---|
| 4,503,514 A | 3/1985 | Urquhart | |
| 5,956,722 A * | 9/1999 | Jacobson et al. ...................... | 1/1 |
| 6,230,155 B1 | 5/2001 | Broder et al. | |
| 6,516,308 B1 | 2/2003 | Cohen | |
| 6,910,077 B2 | 6/2005 | Najork | |
| 6,920,609 B1 | 7/2005 | Manber et al. | |
| 7,020,667 B2 | 3/2006 | Guest et al. | |
| 2004/0030741 A1 | 2/2004 | Wolton et al. | |
| 2004/0036716 A1 | 2/2004 | Jordahl | |
| 2004/0040316 A1 | 3/2004 | Bradley et al. | |
| 2004/0158799 A1 * | 8/2004 | Breuel ........................... | 715/513 |
| 2005/0198569 A1 * | 9/2005 | Fong et al. ..................... | 715/513 |
| 2006/0031774 A1 * | 2/2006 | Gaudette ........................ | 715/764 |
| 2006/0235938 A1 | 10/2006 | Pennell et al. | |
| 2007/0226206 A1 * | 9/2007 | Pavlovski et al. ................. | 707/5 |
| 2008/0044016 A1 | 2/2008 | Henzinger | |
| 2008/0059486 A1 | 3/2008 | Pappas | |
| 2009/0119329 A1 * | 5/2009 | Kwon et al. ................... | 707/102 |
| 2011/0016533 A1 * | 1/2011 | Zeigler et al. ................... | 726/26 |
| 2011/0041053 A1 * | 2/2011 | Liang et al. .................... | 715/234 |

OTHER PUBLICATIONS

McQueen, Tye, Algorithm-Diff—Compute 'intelligent' differences between two files/lists, published at http://search.cpan.org/~tyemq/Algorithm-Diff-1. 1902/lib/Algorithm/Diff.pm, Jul. 3, 2006, 20 pages.

Hickson, Ian and Hyatt, David, HTML5—A vocabulary and associated APIs for HTML and XHTML—W3C Working Draft Jun. 10, 2008, published at http://www.w3.org/TR/2008/WD-html5-20080122/, Jun. 10, 2008, 37 pages.

Gabber, U.S. Appl. No. 12/340,343, filed Dec. 19, 2008, 36 pages.

US Patent and Trademark Office Non-final Office Action for U.S. Appl. No. 12/340,343, mailed Mar. 16, 2011, 21 pages.

Fish & Richardson P.C., Amendment in Reply to Action dated Mar. 16, 2011 in U.S. Appl. No. 12/340,343, filed Jul. 17, 2011, 11 pages.

* cited by examiner

*Primary Examiner* — Angela Lie
(74) *Attorney, Agent, or Firm* — Fish & Richardson P.C.

(57) ABSTRACT

Systems, methods and computer readable media for identifying transient paths within websites. Transient paths can be identified, for example, by identifying a path associated with known transient content and determining that the path exists on other pages associated with the website. If the path exists in other web pages associated with the website, the content associated with the path can be identified as transient content.

14 Claims, 8 Drawing Sheets

IDENTIFYING TRANSIENT PATHS WITHIN WEBSITES

BACKGROUND

This disclosure relates to identifying transient data in web pages.

The world wide web includes an enormous volume of information. Search engines can help to facilitate access to the content by enabling users to search for various topics. Search engines can operate to receive search queries from users and to provide search results associated with those queries to the users. To do this, the search engine can use an index to identify web pages that are relevant to the terms included in the search query. The index can be gathered by examining known web pages and developing key words used to be associated with the web pages. Many web include transient content (e.g., date, time, weather, etc.) which is not useful in identifying the relevancy of a web page to a search query. Transient data can also lead to improperly targeting advertisements by matching transient content, as opposed to the non-transient content. However, it can be difficult to identify transient content on a large scale without extensive computation.

SUMMARY

Apparatuses, systems, computer program products and methods related to the identification of transient paths in websites are disclosed herein. In some implementations, a method can include: receiving identification of known transient content within a first web page, the first web page being associated with a website; identifying a path associated with the known transient content with respect to the first web page; receiving other web pages associated with the website; determining whether the path exists in any of the other web pages associated with the web site; and, if it is determined that the path exists in any of the other web pages associated with the website, identifying the content associated with the path in the other web pages as probable transient content. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations of this disclosure, the systems of this disclosure can operate to identify transient content on web pages. Transient content can be identified as content that is not likely to be contained in the page in the future, and thus it is not likely to help to characterize the page. For example, a page may contain the current weather forecast (e.g. "70 degrees and sunny"). While such information may be useful for people who read the page at the present, it does not describe the rest of the page.

In some implementations, the identified transient content can be used by an indexer to provide index information about the website. For example, transient content is typically not useful for indexing a web page, just like conjunctions, pronouns, etc., are not useful for indexing a web page. Thus, in some implementations, a transient content identification module can prevent the identified transient content from being entered into the index. In other implementations, the transient content is not used when identifying a targeted advertisement for inclusion in the web page.

Figure 1:
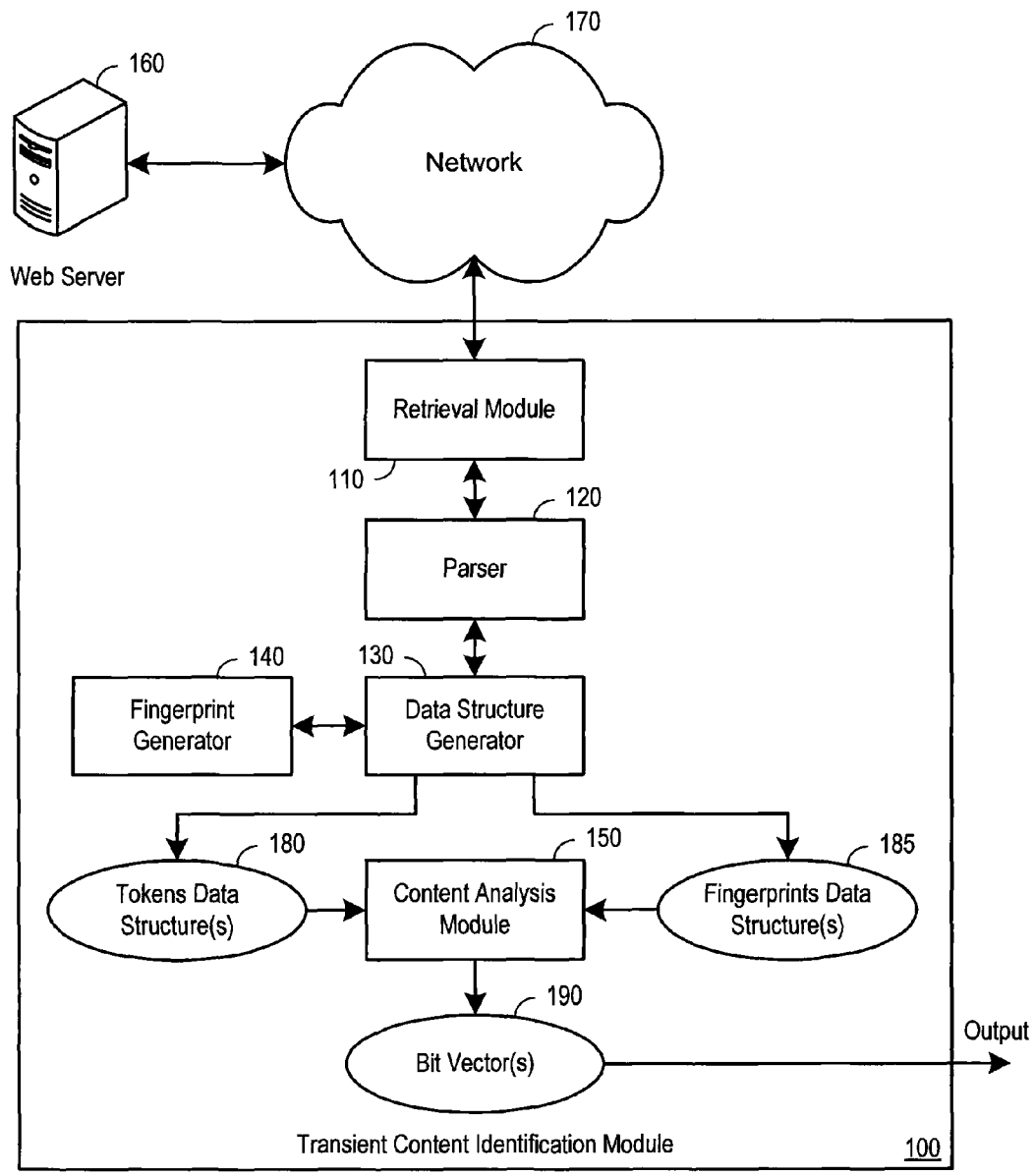
FIG. 1 is a block diagram illustrating an example transient content identification module.

FIG. 1 is a block diagram illustrating an example transient content identification module 100 operable to identify transient content based upon, for example, content variation between versions of pages. The transient content identification module 100 can include a retrieval module 110, a web page parser 120, a data structure (e.g., hash table) generator 130, a fingerprint generator 140, and a content analysis module 150.

The retrieval module 110 can retrieve web pages from a web server 160 through a network 170. In some implementations, the retrieval module 110 retrieves multiple versions of the same web page from the web server 160. Multiple versions of the web page can be used to identify transient content in a web page. For example, multiple versions of the same web page can include content that varies from page to page. An inference can be made that content which is not consistent between two versions of the same page is not important to the classification of the web page.

The web page parser 120 can divide the content of the respective version of the web page into tokens. In some implementations, the parser can identify a web page token based upon the opening or closing of markup language tags (e.g., hypertext markup language tags (HTML)). In additional implementations, the parser can separate web page tokens using an end of line marker. In some implementations, the parser can identify markup language tags as tokens, and the content located between HTML tags as tokens. This content of a web page is the text between the tags. For example, a first version of a web page might include the following markup language:

\<html\>
\<header\>
\<title\>Hello\</title\>
\</header\>
\<body\>
\<h1\>First section\</h1\>
\<p\>
\<em\>
Today is Sunday, June 24th, 2007.
\</em\>
\</p\>
\</body\>
\</html\>

Likewise, a second version of the retrieved page might include the following markup language:
    <html>
    <header>
    <title>Hello</title>
    </header>
    <body>
    <h1>First section</h1>
    <p>
    <em>
    Today is Monday, June 25th, 2007.
    Weather Forecast: Sunny.
    </em>
    </p>
    </body>
    </html>
the parser 120 can divide the markup language for the first version of the web page into the following tokens:
    1: <html>
    2: <header>
    3: <title>
    4: Hello
    5: </title>
    6: </header>
    7: <body>
    8: <h1>
    9: First section
    10: </h1>
    11: <p>
    12: <em>
    13: Today is Sunday, June 24$^{th}$, 2007.
    14: </em>
    15: </p>
    16: </body>
    17: </html>
Similarly, the parser 120 can divide the markup language for the second version of the web page into the following tokens:
    1: <html>
    2: <header>
    3: <title>
    4: Hello
    5: </title>
    6: </header>
    7: <body>
    8: <h1>
    9: First section
    10: </h1>
    11: <p>
    12: <em>
    13: Today is Monday, June 25th, 2007.
    14: Weather Forecast: Sunny.
    15: </em>
    16: </p>
    17: </body>
    18: </html>
Tokens 4, 9, and 13 of the first version and tokens 4, 9, 13, and 14 of the second version contain text, and all other tokens contain HTML tags. The tokens for successively retrieved versions of the same web page can be used to determine whether a portion of the web page has changed, and which specific portion of the web page has changed. The data structure generator 130 can generate a tokens data structure 180 for each of the retrieved versions of the web pages. Each tokens data structure 180 can include one entry for every token in the corresponding version of the web page shown above. In the example shown above, each tokens data structure would include 17 entries.

The data structure generator 130 can call the fingerprint generator 140 for each the tokens included in the versions of the web page. The data structure generator can insert the fingerprint for each token in the corresponding fingerprints data structure 185. There are fingerprints data structures for each version of the page. By way of example, the fingerprints data structure (185) may be implemented by hash tables. Other forms of data structures are possible. The fingerprints data structure 185 can include an entry for every unique fingerprint. It can be that the fingerprints data structure 185 may contain fewer entries than the corresponding tokens data structure 180 if two or more tokens have the same fingerprint, which indicates that the tokens are equal. The fingerprint generator 140 can generate a fingerprint for each of the tokens. The fingerprint is a short numerical description of the token, such that the fingerprints of identical tokens are the same, and the fingerprints of different tokens are likely to be different. In some implementations, the fingerprint of the token is a number that is the result of applying a hash function on the textual representation of the token.

In some implementations, the content analysis module 150 can generate bit vectors 190 for each of the tokens data structures 180 and their associated fingerprints data structures 185. The bit vectors 190 can include a bit for each token in the tokens data structures 180. The content analysis module 150 can scan the tokens in the first tokens data structure 180, compute their fingerprints by calling the fingerprint generator 140, or obtain the previously computed fingerprint, and search for these fingerprints in the second fingerprints data structure 185. If the fingerprints are not found in the second fingerprints data structure, the content analysis module 150 can determine the tokens in the first version of the page that did not appear in the second version of the page. Such tokens are deemed transient content. The content analysis module 150 can thus set the corresponding bits in the first bit vector 190 to denote transient content. In this way the content analysis module can determine the tokens in the first version of the page that did not appear in the second version of the page.

In some implementation the fingerprints data structure 185 is a hash table. Use of a hash table can facilitate constant time insertion and lookups of fingerprints. The content analysis module 150 can continue to perform a comparison between the second tokens data structure 180 and the first fingerprints data structure 185. In this way the content analysis module 150 can determine the tokens in the first version of the page that did not appear in the second version of the page. Similarly, the content analysis module 150 can generate a second bit vector 190 and set the corresponding bits in it to denote transient content that appeared in the second version of the page and not in the first version.

The output of the content identification module 100 and the output of the content analysis module 150 can include two bit vectors 190. Each token corresponding to a bit in the bit vector marked "0" (zero) is non-transient content. Each token corresponding to a bit in the bit vector marked "1" (one) is transient content. In some implementations, the areas (sequences of tokens) marked by the transient content identification module 100 can be extended to include HTML tags that enclose the transient content when all of the tokens included between the opening and closing tags are marked as transient by the bit vectors 190.

In the example provided above, the fingerprints of the tokens in the first tokens data structure 180 can be compared to the second fingerprints data structure 185, and the fingerprints of the tokens in the second tokens data structure 180 can be compared to the first fingerprints data structure 185 to derive the following bit vectors:

| First Token Data Structure | Second Token Data Structure | Initial Bit Vector 1 | Initial Bit Vector 2 | Final Bit Vector 1 | Final Bit Vector 2 |
|---|---|---|---|---|---|
| 1: <html> | 1: <html> | 0 | 0 | 0 | 0 |
| 2: <header> | 2: <header> | 0 | 0 | 0 | 0 |
| 3: <title> | 3: <title> | 0 | 0 | 0 | 0 |
| 4: Hello | 4: Hello | 0 | 0 | 0 | 0 |
| 5: </title> | 5: </title> | 0 | 0 | 0 | 0 |
| 6: </header> | 6: </header> | 0 | 0 | 0 | 0 |
| 7: <body> | 7: <body> | 0 | 0 | 0 | 0 |
| 8: <h1> | 8: <h1> | 0 | 0 | 0 | 0 |
| 9: First section | 9: First section | 0 | 0 | 0 | 0 |
| 10: </h1> | 10: </h1> | 0 | 0 | 0 | 0 |
| 11: <p> | 11: <p> | 0 | 0 | 1 | 1 |
| 12: <em> | 12: <em> | 0 | 0 | 1 | 1 |
| 13: Today is Sunday, June 24$^{th}$, 2007. | 13: Today is Monday, June 25th, 2007. | 1 | 1 | 1 | 1 |
|  | 14: Weather Forecast: Sunny. |  | 1 |  | 1 |
| 14: </em> | 15: </em> | 0 | 0 | 1 | 1 |
| 15: </p> | 16: </p> | 0 | 0 | 1 | 1 |
| 16: </body> | 17: </body> | 0 | 0 | 0 | 0 |
| 17: </html> | 18: </html> | 0 | 0 | 0 | 0 |

The "initial bit vector" columns depict the content of the corresponding bit vectors based on comparing the fingerprints of the tokens in the tokens data structure 180 with the corresponding fingerprint data structure 185. The "final bit vector" columns depict the content of the corresponding bit vectors after extending the areas of transient tokens to include the enclosing HTML tags.

In other implementations, only one type of data structure is used and can be generated for both versions of the web page. Such a data structure can combine the information of the tokens data structure 180 and the fingerprints data structure 185. The data structure for each version can include identification of a token and a fingerprint associated with the token. The content analysis module 150 can select a token from a first data structure (e.g., associated with a first version of the web page) and a fingerprint associated with the token can be retrieved. The retrieved fingerprint can be compared to the fingerprints included in a second data structure (e.g., associated with the second version of the web page). If the retrieved fingerprint from the first data structure is not present in the second data structure, the selected token is marked as a transient token by setting a corresponding bit in a first bit vector 190. When each token from the first data structure has been analyzed, the content analysis module 150 can select a token from the second data structure and retrieve a fingerprint associated with the selected token. The retrieved fingerprint can be compared to the fingerprints included in the first data structure. If the retrieved fingerprint from the second data structure is not present in the first data structure the selected token is marked as a transient token by setting a corresponding bit in a second bit vector 190. When each token from the second data structure has been analyzed, the content analysis module 150 can output the two bit vectors 190 to an indexer or targeted advertising server.

In some implementations, the time complexity of transient content identification module 100 can be linear. In such implementations, the time associated with every operation of the transient content identification module 100 is linear. For example, parsing the web page content into tokens takes a linear amount of time, because it includes scanning the input document once and separating the characters into tokens. Tag tokens can start with a "<" character and extend to the next ">" character, and text tokens extend from the end of the previous token until the next end-of-line or "<" character, whichever comes first. Thus, the transient content identification module in such implementations does not backtrack when parsing the document.

Figure 2:
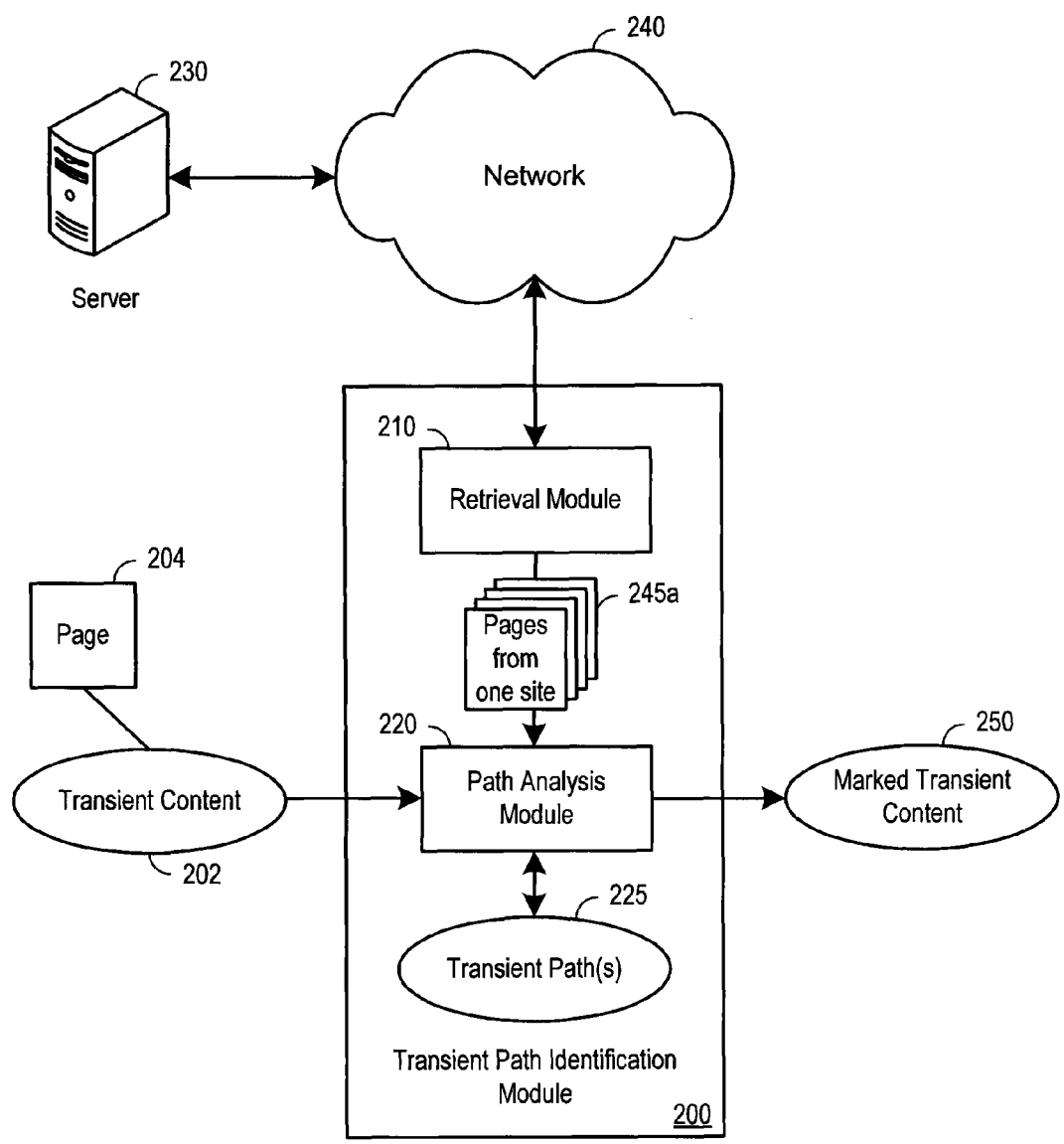
FIG. 2 is a block diagram illustrating an example path identification module.

The transient path identification described in FIG. 2 associates that every token with its parent. The parser 120 may determine the parent of every token using the following algorithm. The parser 120 keeps a stack of the open tokens that have been encountered. The parent of the current token is always the token that is on the top of the stack. When an open tag is encountered, it is pushed onto the stack. When a close tag is encountered, it is matched against the tag at the top of the stack. If the close tag matches the open tag at the top of the stack, the top entry of the stack can be popped. If the close tag does not match the open tag at the top of the stack, the top entries of the stack can be scanned to find a matching opening tag. This may be helpful when the HTML is malformed, which is common to many web pages. If a matching open tag is found in the stack, this entry and all entries on top of it can be popped from the stack. The above determination of the parent of the current token can be performed in linear time.

In some implementation, the number of marked tokens in the two bit vectors 190 can be accumulated. If the ratio of marked tokens to the total number of tokens exceeds a threshold, it is inferred that the web page has undergone a complete reorganization, thereby resulting in a large number of changes. Such websites should not be marked as transient. In this case, each of the bits in the bit vector should be unset by the content analysis module 150.

In some implementations, the transient content identification module 100 can notify an indexing engine of transient content. In other implementations, the transient content module 100 can notify an advertising system of transient content.

FIG. 2 is a block diagram illustrating an example transient path identification module 200 operable to identify transient content based upon, for example, receiving identification of transient content 202 in a web page 204, identifying a path associated with the transient content 202 and finding identical paths in successive web pages. In some implementations, the transient path identification module 200 can include a retrieval module 210 and a path analysis module 220. The transient path identification module 200 can be used to determine a transient path 225 associated with content 204 that has been identified as transient in one page and to identify an identical path in other web pages 245 on the same web site. In some implementations, the identification of identical paths to the transient path 225 can be used to infer transient content in those other pages.

In some implementations, the retrieval module 210 can retrieve multiple versions of multiple web pages from the same website 245, for example, from a server 230 through a network 240. In various implementations, the server 230 can be a crawler or other type of process operable to collect web pages 245 from a website.

The path analysis module 220 can receive an identification of transient content 202 within a web page 204 from an external process (e.g., the transient content identification module 100 of FIG. 1). The path analysis module 220 can determine the path associated with the transient content 202 within the web page. In some implementations, the path analysis module 220 can determine the most general subtree that contains transient information (e.g., including opening and closing HTML tags). The most general subtree can include the set of tokens that have changed between versions and the accompanying HTML tags. A path associated with the most general subtree that includes transient tokens can be labeled as a transient path 225. Once the most general subtree associated with the transient content 202 is located, the path analysis module 220 can identify paths in other pages within the same website that match the transient path 225. When a path in another page in the website matches the transient path, the content associated with the matching path can be identified as transient content and output as the marked transient content 250.

In some implementations, the path analysis module 220 can analyze each of the paths associated with the retrieved web pages 245. The analysis of the paths can include analyzing other web pages 245 to identify paths that are identical to a previously identified transient path 225 in the other web pages 245. In some implementations, the identification of a path in retrieved web pages 245 which is identical to the transient path(s) 225 can be accompanied by analysis of the content associated with the path in those retrieved web pages to determine whether the content associated with the path has changed over multiple pages of the website (e.g., by comparing fingerprints of the tokens associated with the path).

In those instances where a transient path 225 is identified, the path analysis module 220 can use the path to generalize that content from the same website that matches a transient path 225 can be labeled transient content 250 associated with the retrieved pages 245. In some implementations, the transient path 225 information can be provided to an indexing engine, and the indexing engine can avoid indexing the content associated with transient paths 250.

Figure 3:
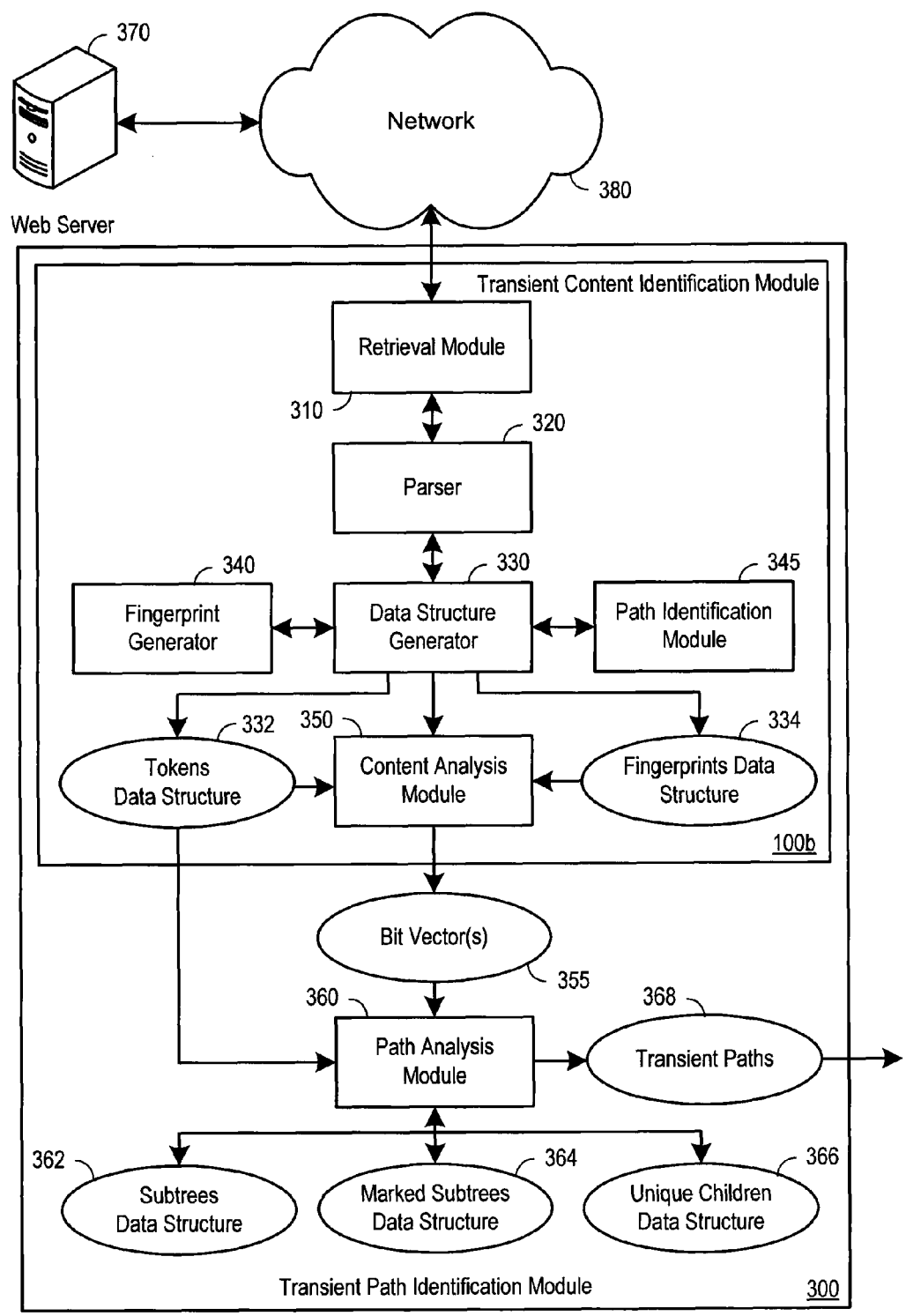
FIG. 3 is a block diagram illustrating an example transient path identification module.

FIG. 3 is a block diagram illustrating another example transient path identification module 300 using, for example, both version analysis and path analysis. The transient path identification module 300 can first identify transient content associated with a particular web page using a transient content identification module 100b, and then identify transient paths associated with the website. The transient content identification module 100b can perform similar operations as the transient content identification module 100 as described in FIG. 1, and its components can perform similar functions to similarly-named components of the transient content identification module 100 of FIG. 1. However, the data structure generator 330 of transient content identification module 100b can call the path generation module 345 to generate the paths associated with tokens as well as path depths associated with the tokens. The path can be generated, for example, by the open markup language tags prior to the current token. The depth can be identified by the number of open tags prior to the current token. In the above example, the path associated with token 4 is "<html><header><title>" and the path depth is 3, because the "<html>," "<header>," and "<title>" tags are open. The path and path depth can be inserted into the tokens data structure 332. The data structure generator 330 can instruct the fingerprint generator 340 to generate fingerprints associated with each of the tokens. The output of the transient content identification module 110b can include bit vectors 355 for the versions of the page, whereby the bits that correspond with transient content are set.

The bit vectors 355 can be provided to a path analysis module 330. In some implementations, the path analysis module 330 can initialize three data structures 362, 364, 366. The three data structures 362, 364, 366 can include, for example, a subtrees hash table, a marked_subtrees hash table, and a unique_children hash table. The key for each of these hash tables can be path strings. The subtrees hash table can include the total number of times the corresponding subtree identified by the path appears in all retrieved pages. The marked_subtrees hash table can include the total number of times the corresponding content associated with a subtree path was marked as changed between versions of the web page. The unique_children hash table can include the number of unique child paths exist for a given path.

In some implementations, the content analysis module 350 can compare the versions of the retrieved pages. The output of the content analysis module 350 can include the list of tokens and the bit vectors of marked tokens of the two versions. The path analysis module 360 calls the transient content analysis module 100b for multiple versions of web pages in the same site. For each page and version, the transient content identification module 100b generates the bit vectors 355 corresponding to each token in each version of the page, along with the corresponding tokens data structure 332. The tokens data structure 332 can include identification of the paths and path depth of every token of every version of the page. The path analysis module 360 updates the data structures by applying the following process for each version of every page. The path analysis module 360 can scan the tokens list for each of the retrieved pages. For the path of every token, the path analysis module 360 can increment the count of associated with the respective path in the subtrees hash table 362. If this was the first time the token's path was identified, the value of the path of the token's parent path can be incremented in the unique_children hash table 366. If the bit vectors generated by the content analysis module 350 indicated that all of the bits corresponding to the subtree rooted at the current token are set, the entry of the marked_subtree hash table 364 associated with the path of the current token is incremented.

In some implementations, the paths in the marked_subtrees hash table which have a count greater than the corresponding count of "subtrees" times the threshold T (e.g., (marked_subtrees(path)>=subtrees(path)*T); or, (marked_subtrees(path)/subtrees(path)>=T)), can be identified as transient paths. Thus, if the token change ratio (e.g., marked_subtrees(path)/subtree(path)) associated with an identical path in multiple web pages changes more than a certain fraction of the time (e.g., threshold (T)), the path is considered a transient path. Moreover, if all paths belonging to subtrees of the current entry of the marked_subtrees hash table can be skipped (e.g., if a parent path is transient, the child paths that are subtrees of the parent can also be identified as transient).

In some implementations, the path analysis module 360 can determine that other paths in the subtrees hash table for which all unique children paths have been identified as transient will also be identified as transient. Thus, a determination is made whether the union of all subtrees of a current path have already been identified as transient. If these path have been identified as transient the current path is added to the list of transient paths.

In some implementations, the threshold (T) can be set at substantially fifty percent. In such implementations, the path analysis module 360 will identify paths as transient if the tokens associated with those paths change more than half (50%) of the time they are found in any version of the page. In other implementations, the threshold (T) can be set to 1. In such implementations, the path analysis module 360 identifies a path as transient only if the tokens associated with a path changes each time the path appear in any version of any page.

In some implementations, a maximum percentage of changes can be identified. Thus, when the path analysis module 360 determines that more than the maximum percentage of the paths are being marked as transient, it is likely that the website has undergone significant restructuring and the identification of transient content is not reliable between versions.

In some implementations, a particular path may become so complex that it can be considered unlikely to include transient content. For example, if a programmer has gone through the difficulty of creating a path includes over a threshold number of characters, it is unlikely that the content is unimportant. In some examples, the threshold maximum number of characters in a path is set at 1,000 characters. In this example, paths over 1,000 characters in length can be skipped. Assigning a threshold maximum number of characters to a path enables the path analysis module 360 to retain a linear complexity to the operations associated with the identification of transient paths 368.

Figure 4A:
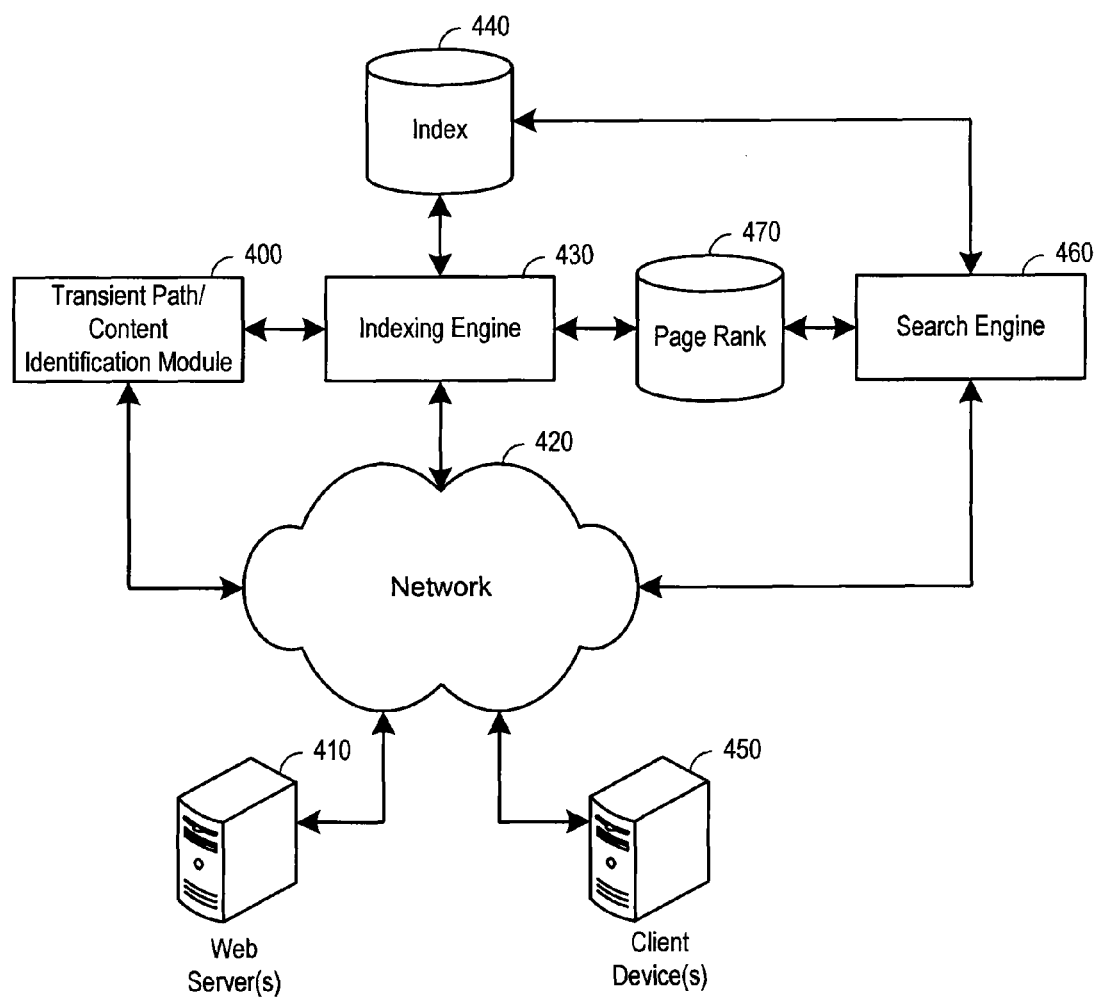
FIG. 4A is a block diagram illustrating an example use of a transient path/content identification module.

FIG. 4A is a block diagram illustrating an example use of a transient path/content identification module 400 for improving web search quality. The transient path/content identification module 400 can retrieve web pages associated with a website from a web server 410 through a network 420. In some implementations, the web server 410 can include more than one website. In other implementations, the website can be served by multiple web servers 410. In further implementations, multiple web pages associated with multiple websites can be retrieved from multiple web servers 410. In some implementations, the transient content identification module can operate to identify transient content and/or transient paths associated with a web page and/or website, respectively.

The transient content identified by the transient path/content identification module 400 can be provided to an indexing engine 430. In some implementations, the indexing engine 430 can avoid using the provided transient content in generating an index 440 or it can ignore links appearing in transient content during the computation of page rank 470. For example, the indexing engine 430 can use the transient content to remove those portions of the web page which do not provide relevant information to the user from the index 440. In another example, the indexing engine 430 can skip over the paths and/or tokens identified by the transient content identification module when creating the index 440. The index 440 in some implementations, does not include transient content. In yet another example, the indexing engine can compute the page rank 470 of web pages, which is a measure of page quality, by counting the links pointing at the page. The indexing engine can ignore links that appear in content identified by the transient content identification module.

In some implementations, one or more client devices 450 can send search queries to a search engine 460 through network 420 using a search engine interface provided by the search engine 460. In various implementations, the search query can include one or more search terms. Upon receipt of the search query, the search engine 460 can query the index 440 to determine which pages use the search terms included in the search query. The most relevant pages to the search can be indicated by the frequency with which the search terms appear in the indexed web page which can be identified by an information retrieval (IR) score. Moreover, because the index 440 does not include transient content, the IR scores of the indexed web page can be more accurate.

Based upon the relevant pages received from the index 440, the search engine 460 can query a page rank database 470. The page rank database 470 can measure the quality of the web pages returned by the index 440 based upon, for example, the number of pages linking to those web pages. The search engine can then combine the IR score and the page rank of the relevant web pages to derive a final score. The final score can determine which result page(s) are returned to the client device 450 and an order in which result pages are presented to the user on the client device 450. Other ranking and scoring systems and methodologies can be used.

Figure 4B:
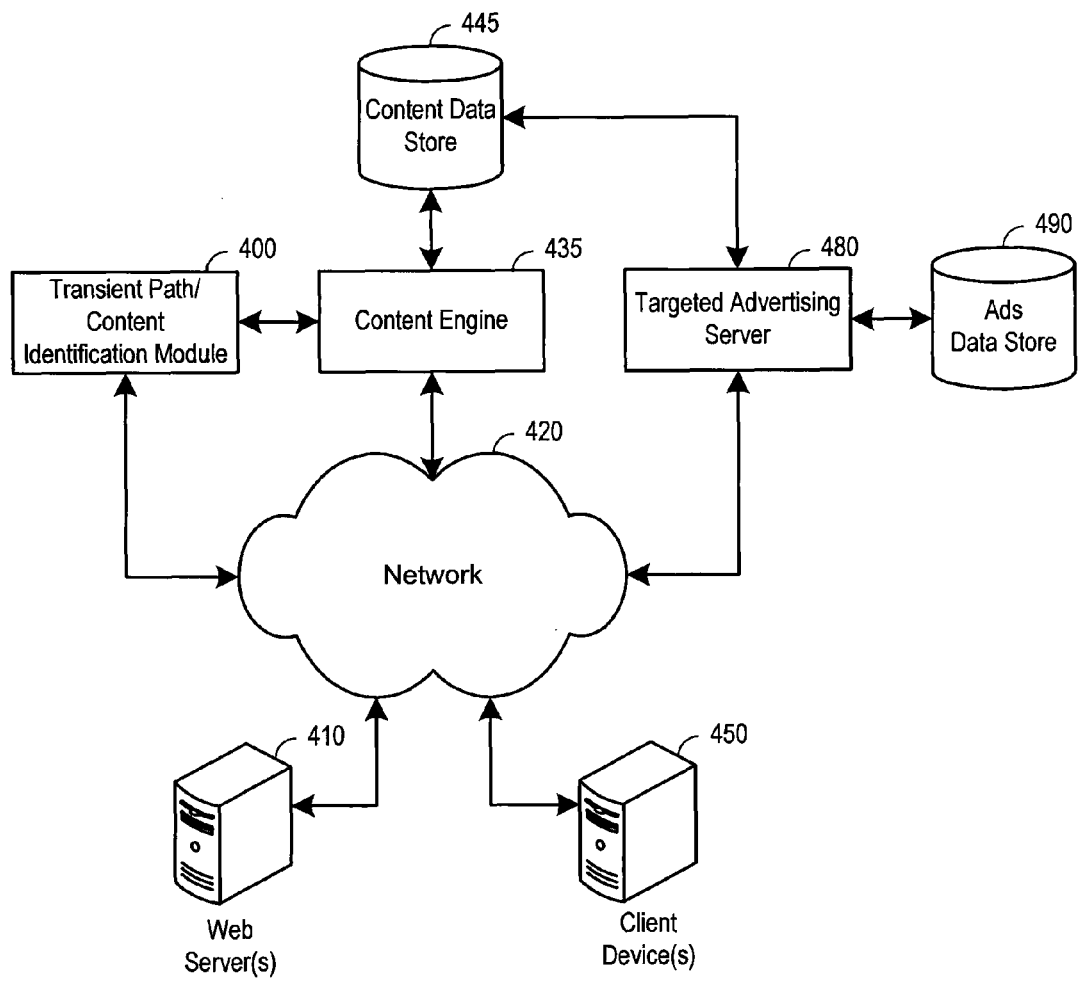
FIG. 4B is a block diagram illustrating an example use of a transient path/content identification module 400.

FIG. 4B is a block diagram illustrating an example use of a transient path/content identification module 400 for improving content ads targeting. The content engine 435 can retrieve versions of web pages associated with a website from a web server 410 through a network 420. The web pages belong to web sites who wish to display targeted ads. The content engine 435 sends the versions of the web pages to the transient path/content identification module 400. Transient content identified by the transient path/content identification module 400 can be removed from the page content written to the content data store 445. In some implementations, the content engine 435 can avoid using the provided transient content in generating an index 440.

In some implementations, one or more client devices 450 can send requests for a web page to the web server(s) 410. Upon receiving the request for documents, the web server(s) 410 can request an advertisement from a targeted advertisement server 480. The targeted advertisement server 480 can pull the content of the web page requested by the client device 450 from the content data store 445. Because the content data store 445 does not include transient content associated with the web page, the advertisement selected from the advertisement data store 490 is better targeted to the content on the web page requested by the client device 450. Other targeted advertisement systems and methodologies can be used.

Figure 5:
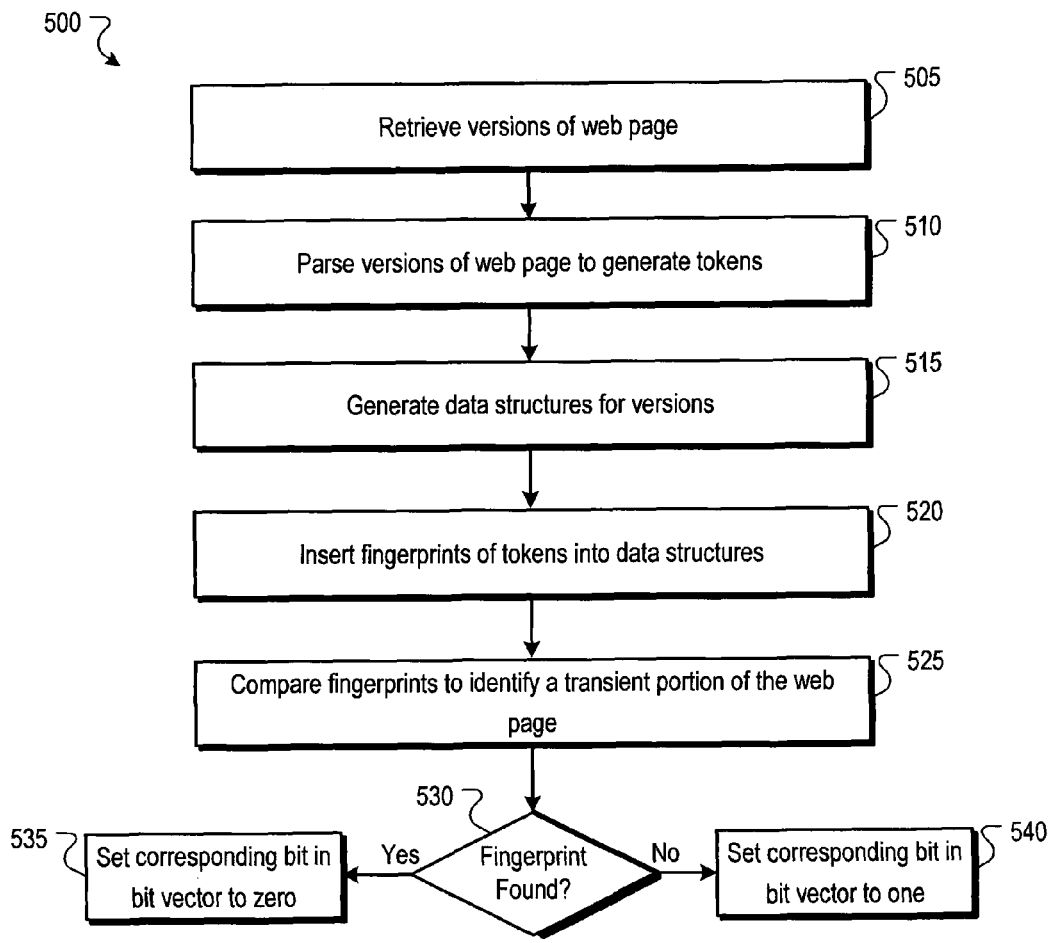
FIG. 5 is a flowchart illustrating an example method of transient content identification.

FIG. 5 is a flowchart illustrating an example method 500 of transient content identification. At stage 505, multiple versions of the web page are retrieved. Multiple versions of the web page can be retrieved, for example, by a retrieval module (e.g., retrieval module 110 of FIG. 1, or retrieval module 310 of FIG. 3). The retrieval module can retrieve multiple versions of a multiple web pages using an automated retrieval process.

At stage 510, the retrieved versions of the page can be parsed to generate a list of tokens. The versions of the web page can be parsed, for example, by a parsing module (e.g., parser 120 of FIG. 1, or 320 of FIG. 3). In some implementations, the web pages can be written in Hypetext Markup Language (HTML). The tokens can include tag tokens and content tokens. The tag tokens are identified by the opening or closing of a tag. The content tokens occur between tag tokens. In some implementations, the end of a content token can be based upon an end-of-line marker (e.g., carriage return).

At stage 515, data structures (e.g., hash tables) can be generated for the versions of the web page. Hash tables can be generated, for example, by a data structure generator module (e.g., data structure generator 130 of FIG. 1, or data structure generator 330 of FIG. 3). In some implementations, the data structures can be keyed by a path associated with the token. In some implementations, the data structures can include a first and second data structures. The first data structure can include an entry for each token included in a retrieved first version of the web page, while the second data structure can include an entry for each token included in a retrieved second version of the web page.

At stage 520, fingerprints associated with the tokens can be inserted into the data structure (e.g., hash tables). Fingerprints associated with the tokens can be inserted into data structures, for example, by a data structure generator (e.g., data structure generator 130 of FIG. 1, or data structure generator 330 of FIG. 3) in conjunction with a fingerprint generator (e.g., fingerprint generator 140 of FIG. 1, or fingerprint generator 340 of FIG. 3).

At stage 525, the fingerprints can be compared to identify transient portions of the web page. The fingerprints can be compared, for example, by a content analysis module (e.g., content analysis module 150 of FIG. 1, or content analysis module 350 of FIG. 3). In some implementations, each of the fingerprints from a first data structure can be compared against the fingerprints of the second data structure.

At stage 530, it is determined whether the fingerprint from the first data structure match any of the fingerprints of the second data structure. The determination of whether the fingerprints match can be made, for example, by a content analysis module (e.g., content analysis module 150 of FIG. 1, or content analysis module 350 of FIG. 3).

If the fingerprint from the first data structure match the fingerprints from the second data structure, a corresponding bit in a bit vector is set to zero (stage 535). The corresponding bit in the bit vector can be set to zero, for example, by a content analysis module (e.g., content analysis module 150 of FIG. 1, or content analysis module 350 of FIG. 3).

If the fingerprint from the first data structure do not match the fingerprints from the second data structure, a corresponding bit in a bit vector is set to one (stage 540). The corresponding bit in the bit vector can be set to one, for example, by a content analysis module (e.g., content analysis module 150 of FIG. 1, or content analysis module 350 of FIG. 3).

In some implementations, each of the fingerprints from a second hash table can be compared against the fingerprints of the first hash table. If a fingerprint from the second hash table is not identified in the first hash table, a bit associated with the token whose fingerprint was not found is set in a second bit vector. The tokens associated with the set bits of the bits vectors are identified as transient content. The bits of the first and second bit vectors indicate whether the corresponding tokens are in the transient part of the page.

Figure 6:
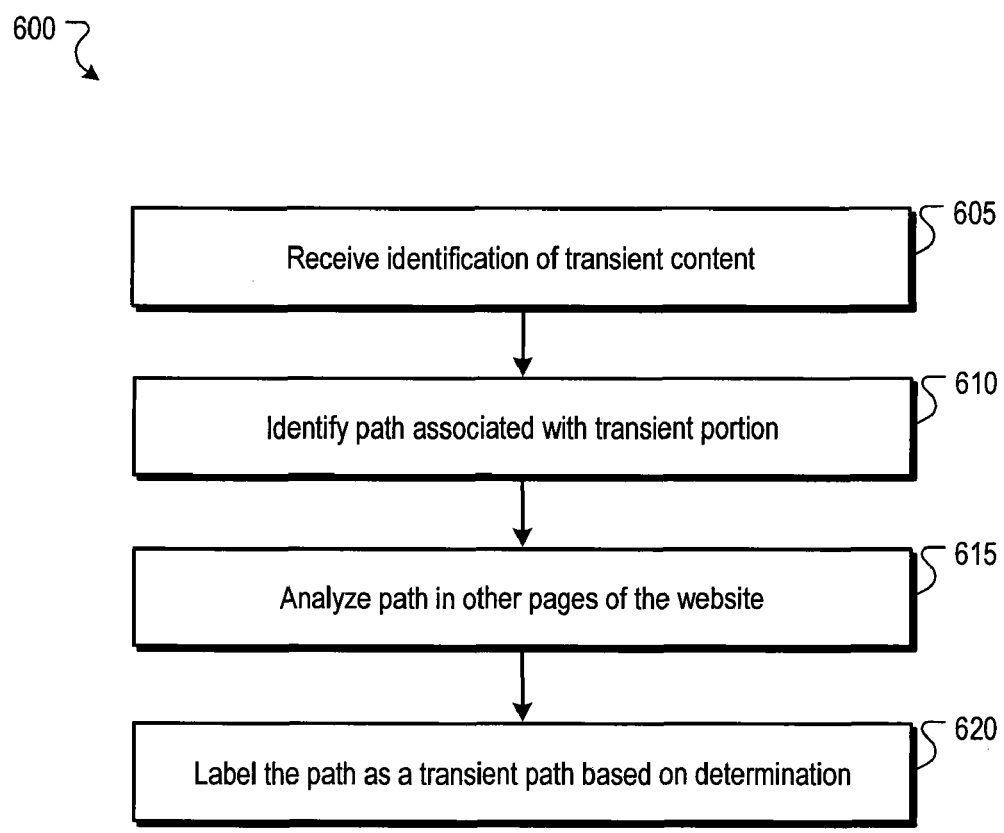
FIG. 6 is a flowchart illustrating another example method of transient content identification.

FIG. 6 is a flowchart illustrating another example method 600 of transient content identification. At stage 605, identification of transient content associated with a web page is received. The identification of transient content, for example, can be received by a transient path identification module (e.g., transient path identification module 200 of FIG. 2). In some implementations, the identification of transient content can be provided by a transient content identification module (e.g., transient content identification module 100 of FIG. 1). Other processes to identify transient content can be used.

At stage 610, a path associated with the transient portion of a web page is identified. The path associated with the transient portion of the web page can be identified, for example, by a path analysis module (e.g., path analysis module 220 of FIG. 2, or path analysis module 360 of FIG. 3). The path can be generated by concatenating each of the open markup language tags that occur prior to the token identified as transient content.

At stage 615, the path can be analyzed in other web pages associated with the website. The analysis of the path in other web pages can be performed, for example, by a path analysis module (e.g., path analysis module 220 of FIG. 2, or path analysis module 360 of FIG. 3). In some implementations, the path analysis can include merely identifying the existence of the path in other pages of the website. In other implementations, the path analysis can determine how frequently a token associated with the path is identified as transient content in other pages of the website. If the tokens associated with the path are identified as transient content more than a threshold percentage of the times it appears, the path is identified as a transient path.

At stage 620, the path is labeled as transient based upon the analysis. The path can be labeled as transient, for example, by a path analysis module (e.g., path analysis module 220 of FIG. 2, or path analysis module 360 of FIG. 3). In some implementations, labeling a path as a transient path can indicate to an indexing engine that a token associated with the path should not be indexed.

Figure 7:
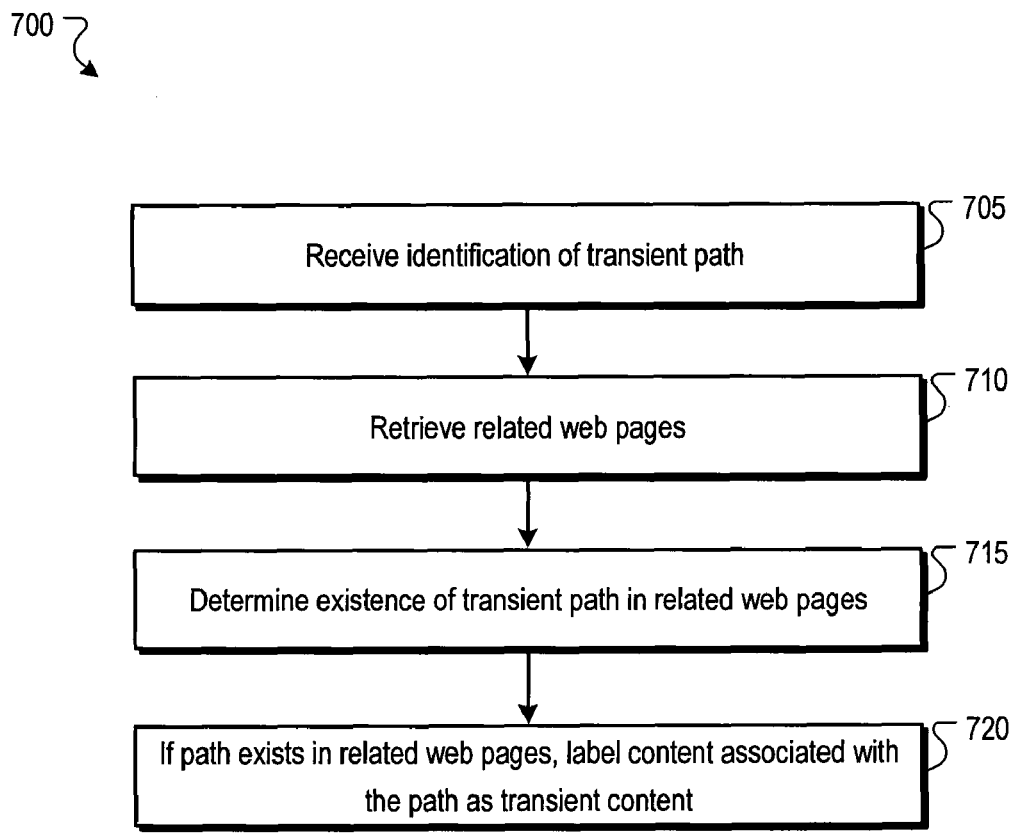
FIG. 7 is a flowchart illustrating example method for utilizing an identified transient path.

FIG. 7 is a flowchart illustrating example method 700 for utilizing an identified transient path. At stage 705, the identification of a transient path is received. The identification of a transient path can be received, for example, by a transient path analysis module (e.g., path analysis module 220 of FIG. 2). In some implementations, the identification of a transient path can also be made by the transient path analysis module. The identification of a transient path can be made by analyzing paths associated with content on multiple versions of multiple web pages to determine that the path is frequently associated with transient content.

At stage 710, related web pages can be retrieved. These web pages can be retrieved, for example, by a retrieval module (e.g., retrieval module 210 of FIG. 2). The retrieval module can retrieve the related web pages from a server (e.g., server 230 of FIG. 2). In various implementations, the related web pages can be other pages in the same website (e.g., with the same domain name) and/or subsequent versions of the same web page. Other relationships can be used.

At stage 715, existence of a transient path in related web pages is determined. The existence of a transient path in related web pages can be determined, for example, by a path analysis module (e.g., path analysis module 220 of FIG. 2). In some implementations, the transient path can be compared against the paths in related web pages to determine whether the transient path is present in those related web pages. The presence of a transient path in related web pages can indicate that the content associated with that path is transient.

At stage 720, if path exists in related web pages, content associated with the path is labeled as transient content. The path can be labeled as transient content, for example, by a path analysis module (e.g., path analysis module 220 of FIG. 2). In some implementations, the path analysis module can output the related web pages while labeling which of the content in those related web pages is transient content. The output web pages with labeled transient content can be used to index web pages to better target advertisements and/or improve search results.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving identification of known transient content within a first web page, the first web page being associated with a website;
   identifying a path associated with the known transient content with respect to the first web page;
   receiving other web pages associated with the website;
   determining whether the path exists in any of the other web pages associated with the web site;

if it is determined that the path exists in any of the other web pages associated with the website, identifying the content associated with the path in the other web pages as probable transient content;

for each of the web pages including the path, identifying a transient frequency with which content identified by the path changes over multiple versions of each of the web pages that include path;

comparing the transient frequency with a threshold frequency;

if the transient frequency exceeds the threshold frequency, identifying the path as a transient path;

identifying transient content from the probable transient content based upon the transient path; and identifying targeted advertisements for web pages associated with the website, wherein content identified as transient content is excluded from consideration in identifying the targeted advertisements.

2. The method of claim 1, wherein receiving identification of known transient content within the first web page comprises receiving one or more bit vectors associated with the first web page, the bit vector comprising an entry for each token in the markup language defining the web page, the status of the bits indicating whether or not a respective token is transient.

3. The method of claim 2, further comprising identifying the tokens based upon the opening and closing of markup language tags or end-of-line tag in the respective versions of the web page.

4. The method of claim 1, further comprising indexing the portions of the web page which are not identified as probable transient content with respect to the web page.

5. The method of claim 1, further comprising indexing the portions of the web page which are not identified as transient content with respect to the web page.

6. A method comprising:
receiving identification of known transient content within a first web page, the first web page being associated with a website;
identifying a path associated with the known transient content with respect to the first web page;
receiving other web pages associated with the website;
determining whether the path exists in any of the other web pages associated with the web site;
if it is determined that the path exists in any of the other web pages associated with the website, identifying the content associated with the path in the other web pages as probable transient content;
identifying a path associated with the known transient content on the first web page;
identifying a subtree count comprising a number of times the path appears in other web pages associated with the website;
identifying a marked subtree count comprising a number of times content associated with the path changes between versions of the respective web pages in which the path appears;
comparing the subtree count with the marked subtree count; and
identifying the path as a transient path based upon the comparison.

7. The method of claim 6, wherein a path is identified as a transient path when a ratio between the number of changes associated with the path between versions of the respective web pages divided by the number of times the path appears in other web pages associated with the website is greater than a threshold frequency, whereby if the path changes more than a threshold frequency the path is identified as a transient path.

8. One or more computer readable media, operable to cause one or more data processing apparatuses to perform operations comprising:
receiving identification of known transient content within a first web page, the first web page being associated with a website;
identifying a path associated with the known transient content with respect to the first web page;
receiving other web pages associated with the website;
determining whether the path exists in any of the other web pages associated with the web site;
if it is determined that the path exists in any of the other web pages associated with the website, identifying the content associated with the path in the other web pages as probable transient content
retrieving each of the pages including the path;
identifying a transient frequency with which content identified by the path changes over multiple versions of each of the pages that include path;
comparing the transient frequency with a threshold frequency;
if the transient frequency exceeds the threshold frequency, identifying the path as a transient path;
identifying transient content from the probable transient content based upon the transient path; and
identifying targeted advertisements for web pages associated with the website, wherein content identified as transient content is excluded from consideration in identifying the targeted advertisements.

9. The computer readable media of claim 8, further operable to cause the one or more data processing apparatuses to perform operations comprising indexing the portions of the web page which are not identified as probable transient content with respect to the web page.

10. One or more computer readable media, operable to cause one or more data processing apparatuses to perform operations comprising:
receiving identification of known transient content within a first web page, the first web page being associated with a website;
identifying a path associated with the known transient content with respect to the first web page;
receiving other web pages associated with the website;
determining whether the path exists in any of the other web pages associated with the web site;
if it is determined that the path exists in any of the other web pages associated with the website, identifying the content associated with the path in the other web pages as probable transient content;
identifying a path associated with the known transient content on the web page;
identifying a subtree count comprising a number of times the path appears in other web pages associated with the website;
identifying a marked subtree count comprising a number of times content associated with the path changes between versions of the respective web pages in which the path appears;
comparing the subtree count with the marked subtree count; and
identifying the path as a transient path based upon the comparison.

11. One or more computer readable media, operable to cause one or more data processing apparatuses to perform operations comprising:

receiving identification of known transient content within a first web page, the first web page being associated with a website;

identifying a path associated with the known transient content with respect to the first web page;

receiving other web pages associated with the website;

determining whether the path exists in any of the other web pages associated with the web site;

if it is determined that the path exists in any of the other web pages associated with the website, identifying the content associated with the path in the other web pages as probable transient content;

wherein a path is identified as a transient path when a ratio between the number of changes associated with the path between versions of the respective web pages divided by the number of times the path appears in other web pages associated with the website is greater than a threshold frequency, whereby if the path changes more than a threshold frequency the path is identified as a transient path.

12. A method comprising:

receiving identification of known transient content within a web page, the web page being associated with a web site;

identifying a path associated with the known transient content on the web page;

identifying a subtree count comprising a number of times the potential transient path appears in other web pages associated with the website;

identifying a marked subtree count comprising a number of times content associated with the potential transient path changes between versions of the respective web pages in which the path appears;

comparing the subtree count with the marked subtree count; and identifying the path as a transient path based upon the comparison.

13. The method of claim 12, further comprising identifying a targeted advertisement associated with web pages on the web site, wherein content associated paths identified as transient paths are excluded from consideration in identifying the targeted advertisement.

14. The method of claim 12, further comprising indexing the web pages on the web site, wherein content associated paths identified as transient paths are excluded from inclusion in the indexing.

* * * * *